United States Patent [19]

Sikora

[11] 4,088,952

[45] May 9, 1978

[54] PROCESS AND APPARATUS FOR DETERMINING THE POSITION OF AN ELONGATED OBJECT WITH RESPECT TO A REFERENCE AXIS

[75] Inventor: Harald Sikora, Bremen, Germany

[73] Assignee: Maschinenbau Scholz GmbH & Co. KG, Westfalen, Germany

[21] Appl. No.: 685,974

[22] Filed: May 13, 1976

[30] Foreign Application Priority Data

May 13, 1975 Germany .............................. 2521278

[51] Int. Cl.² .......................................... G01R 33/12
[52] U.S. Cl. ..................................... 324/207; 324/239
[58] Field of Search ............................. 324/34 R, 34 E

[56] References Cited

U.S. PATENT DOCUMENTS

| 3,250,983 | 5/1966 | Atkinson ............................ 324/34 R |
| 3,470,460 | 9/1969 | Panofsky et al. .................. 324/34 R |

FOREIGN PATENT DOCUMENTS

| 255,559 | 5/1963 | Australia ............................ 324/34 R |
| 984,762 | 7/1951 | France ................................ 324/34 E |
| 574,618 | 1/1946 | United Kingdom ............... 324/34 E |

Primary Examiner—Robert J. Corcoran
Attorney, Agent, or Firm—Andrus, Sceales, Starke & Sawall

[57] ABSTRACT

A process and apparatus for determining the position of elongated objects such as insulated cable, tubing, and the like, with respect to a reference axis, for example, that of a vulcanizing tube in which a localized magnetic alternating field is produced around a specified section of the object and the intensity of the magnetic field produced by the current induced in the object is diametrically measured at a distance from this section. A signal proportional to the sum of measured field intensities is used to regulate the field strength of the localized magnetic field so that a signal proportional to the difference of the measured field intensities becomes an indication of the absolute position of the object with respect to the reference axis.

14 Claims, 2 Drawing Figures

PROCESS AND APPARATUS FOR DETERMINING THE POSITION OF AN ELONGATED OBJECT WITH RESPECT TO A REFERENCE AXIS

FIELD OF THE INVENTION

This invention relates to a process for determining the slack of an elongate object such as cable, tubing etc., provided with an insulating material, particularly in a vulcanising plant.

BACKGROUND OF THE INVENTION

With conduits which are to be vulcanised and are guided freely through a long vulcanising tube a specified position should be maintained where possible. They should be constantly centred in relation to the extruder where possible and on no account be so slack that they touch the tube wall of the vulcanising tube, as slight damage, indentations and the like impair the quality of the insulation in the insulating covering considerably and may lead to the necessity to reject the conduit. Moreover, precise guiding of the conduit in the vulcanising tube effects uniform covering of the conduit.

For the above reasons it is necessary to measure the slack of the conduit at one or several points on the vulcanising tube in order to avoid undesirable results. It is already known that a feeling roll can be put in the vulcanising tube which detects the position of the conduit and visibly indicates slack. A particular disadvantage however of a feeling roll of this type is that it must come into contact with the insulation material when it is still soft and under certain circumstances causes undesired impressions or grooves therein. Because of this disadvantage and further defects, visual observation of the position of the conduit in the vulcanising tube is frequently restricted to an inspection glass provided in it.

An object of the invention is therefore to provide a process and apparatus for determining the slack of an elongate object surrounded by an insulating layer, preferably an insulated conduit within a vulcanising tube. This process and apparatus allows the position of the object to be determined with simple means without impairing the insulating casing.

SUMMARY OF THE INVENTION

According to the invention a limited magnetic alternating field is produced around a specified section of the object, the magnetic field intensity is measured at at least two separate places at a distance from this section and at a radial distance from the object, and the two field intensity values and corresponding proportional dimensions are compared with each other.

The invention is based on the knowledge that the electrically conductive section of the insulated object is part of a closed circuit, which, as long as it is still uncovered is connected to earth and at the other end is also earthed via the capacitance of the insulation covering. With the aid of the measuring process and apparatus according to the invention an alternating current is induced in the electric conductor, and this current produces an electro-magnetic field around the conduit. The process according to the invention makes use of the fact that the intensity of this alternating field decreases quadratically at a radial distance from a conductor. If the magnetic field is measured at two points, preferably opposite each other, and if a comparison is drawn between the measurement results, conclusions can be drawn on the position of the conductor in relation to the two points of measurement. Preferably the places of measurement should lie diametrically opposite each other and at the same distance from the theoretical longitudinal axis of the object.

Although the process and apparatus according to the invention is described in the following text in connection with the determining of the slack of a conduit in a vulcanising plant, preferably within a vulcanising tube, this does not mean that it cannot be applied to other cases where similar conditions exist, i.e. where a cable, tube or the like is to be measured with regard to its position at one or several places in conjunction with other insulation coating processes. The requirement is simply that a current can be induced with the aid of an electro-magnetic alternating field which must naturally be in a closed circuit. For example, even the slack of a non-conductive rubber tubing can be measured if it is provided with an electrically conductive core.

In order to obtain sufficiently exact results, care must be taken that the generated alternating field does not affect the measuring alternating field, and that the reverse effect is kept as small as possible. For this reason the production area of the generated alternating field and the measuring places may be positioned approximately 2 meters from each other.

For carrying out the process and apparatus according to the invention suitable elements and control appliances can be used. For example, there may be provided a coil attached to an alternating current generator and joined to the vulcanizing tube. This coil induces a current in the conduit. It is also proposed that at a distance from the coil two magnetic field detectors are placed at a radial distance from the conduit, the output of which is attached to a comparison device which determines the difference of the output signals and registers them on an indicating device.

As there are capacitances in series in the measuring circuit (e.g. insulation covering) it is advantageous if the frequency of the alternating current generator is chosen sufficiently high to produce a sufficient current. It is also advantageous if a frequency in the lower area of the usual high frequency, e.g. 20 kilohertz, is chosen.

The magnetic alternating field for inducing a current in the conduit can again be assembled in some suitable way. An embodiment of the invention provides in this context for a toroidal core to be placed around the cable having at least one coil winding. This latter is connected to the output of the alternating current generator. The toroidal core can for example consist of normal or special transformer sheets.

Various methods are available for the measurement of the magnetic field, for example the use of coils, preferably air-coils, as magnetic field detectors. It is however also possible to use Hall generators or other magnetic sensors. In order to obtain sufficient screening against the field produced by 2.C. generator, a further embodiment of the invention provides for the magnetic field detectors to be shielded with the aid of a further toroidal core.

The process and apparatus according to the invention for measuring the slack of a conduit within a vulcanising tube is especially advantageous. In this connection one embodiment of the invention provides for the inside diameter of the toroidal core to correspond to the internal diameter of the vulcanising tube. The toroidal core is preferably set in an extended section of the vulcanising tube, and also the magnetic field detectors, but at a distance from these.

Evaluation of the signals obtained from the magnetic field detectors can again be effected by means of suitable control appliances. One embodiment of the invention provides in this connection that the comparing device has an adding part which adds the output signals of the magnetic field detectors, that the output signals of the adding part are provided in a theoretical actual value comparison circuit and the error signal is applied to the input of the alternating current generator. This method ensures that sufficient current is constantly induced in order to measure precisely any deviation of the conduit.

A further embodiment according to the invention provides for the comparison device to have an adding part which adds the output signals of the magnetic field detectors and a subtraction part which subtracts the output signals of the magnetic field detectors, and that the output signal of the subtraction part is put on a phase-controlled rectifier which is controlled by the output signal of the adding part. The phase-controlled rectifier effects a correct evaluation of the signals obtained from the magnetic field detectors. The measuring signal is preferably given on a zero indicator on which a deviation on one side or the other can be optically established.

BRIEF DESCRIPTION OF THE DRAWINGS

The invention will now be further described, by way of example only and with reference to the accompanying drawings, in which.

DESCRIPTION OF THE PREFERRED EMBODIMENT

Figure 1:
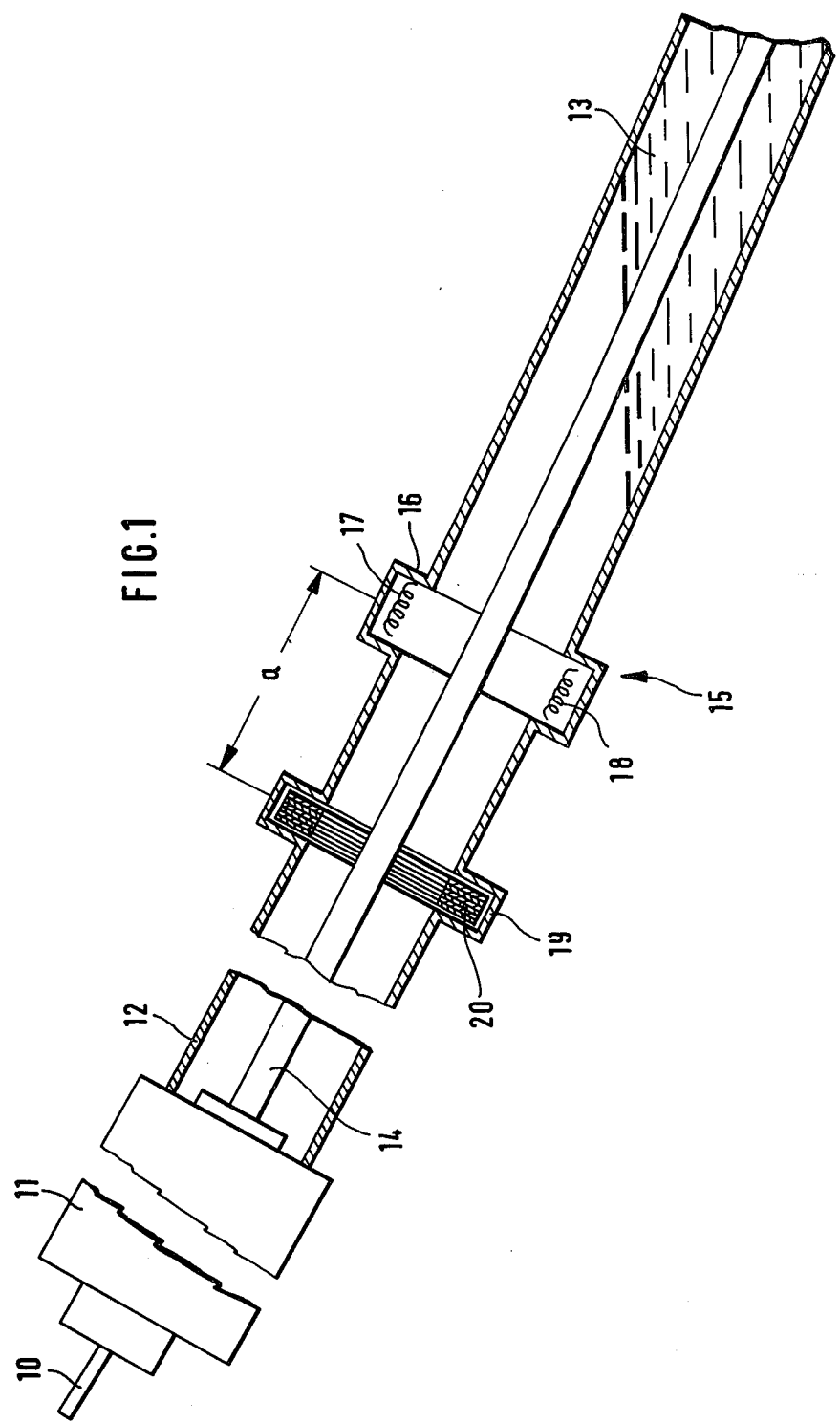
FIG. 1 shows schematically a section through a vulcanising tube with components of the measuring device according to the invention.

As shown in FIG. 1, an uncoated conductor wire 10 is fed to an extrusion device 11 in a way not shown, where it is coated with a vulcanisable material. The conductor 10 covered in this way leaves the device 11 insulated (or covered) and enters a vulcanising tube 12 where there is a temperature of 200° to 250° C and a pressure of 10 to 30 bars. The heat is produced by hot water vapour which is fed in and which condenses in the lower area of the vulcanising tube 12 set slanting and consequently forms the beginning of a cooling zone 13. In the actual vulcanising zone of the vulcanising tube 12 the insulation is still relatively soft so that where possible any mechanical contact with this is to be avoided in order to avoid damage which impairs the quality of the covering. Moreover, care must be taken that the conduit 14 is guided centred in the vulcanising tube where possible in order to obtain uniform coating of the conduit. It is therefore necessary to measure the position of the conduit 14 at one or several points in relation to the walls of the vulcanising tube, in order to introduce corrections where necessary.

In FIG. 1 a point of measurement 15 is provided where the slack of the conduit 14 is measured. For this purpose the vulcanising tube 12 has a section 16 with an extended diameter, whereby at two diametrically opposite points there are magnetic detectors 17, 18 which can for example be air-coils. At a distance from the measuring point 15, for example at a distance $a = 2$ m, the vulcanising tube 12 has a further section with an enlarged diameter in which there is a transformer core 20, the internal diameter of which corresponds to the inner diameter of the vulcanising tube. The annular transformer core 20 is made for example of special transformer sheet.

Figure 2:
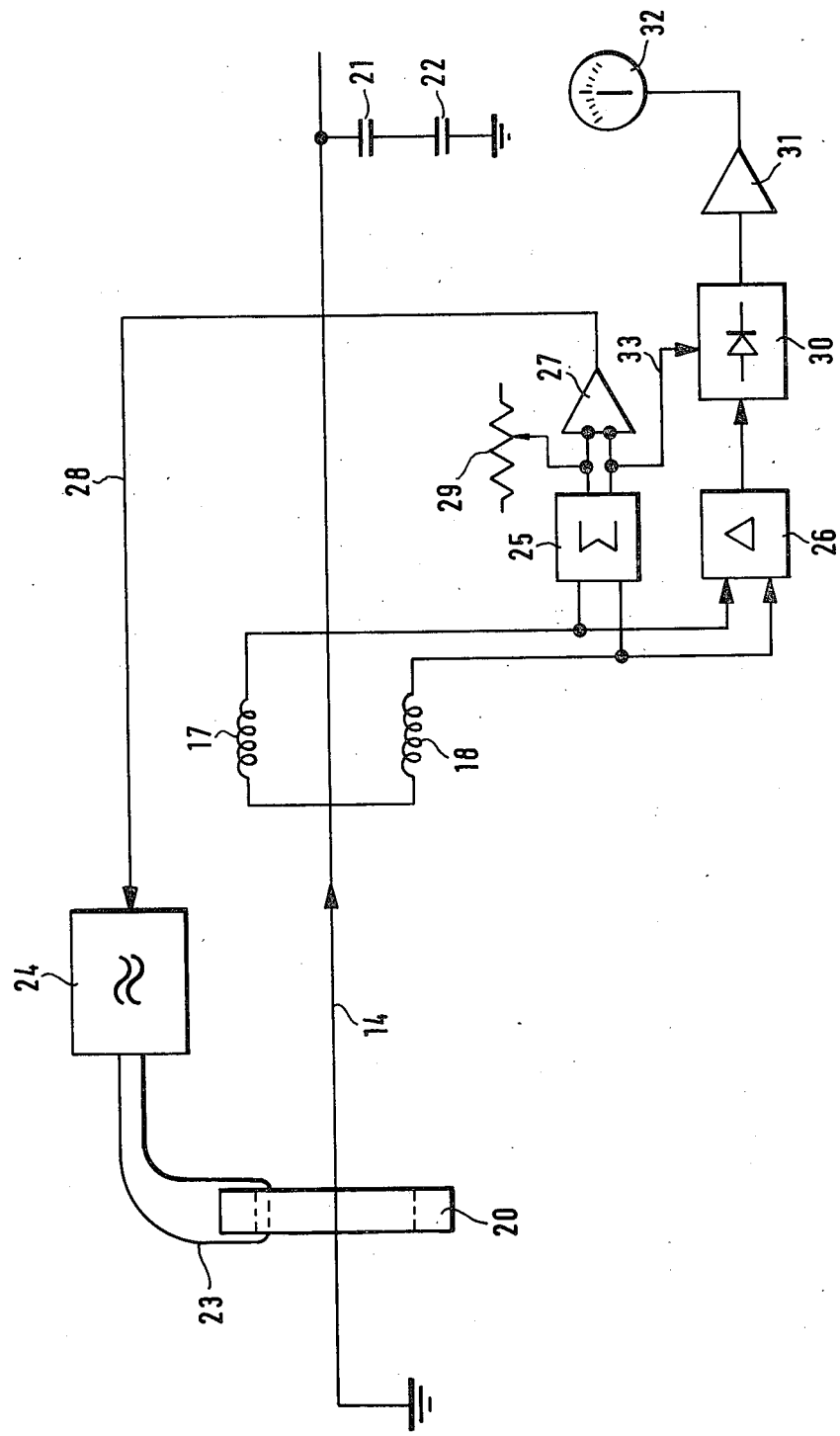
FIG. 2 shows schematically a circuit diagram of the measuring device according to the invention.

In FIG. 2, a schematic circuit diagram of the conduit 14 and a block circuit diagram of a measuring device for determining the deviation of the conduit 14 in the vulcanising tube 12 (FIG. 1) is shown. The conduit 14 is connected to earth at the left hand end by means of the uncovered conductor. At the right hand end (in FIG. 2) there is a connection to earth via the capacitance of the insulation covering, indicated by a condenser 21 and the capacitance of the stretch of water between the insulation surface and the vulcanising tube indicated by a condenser 22 whereby the vulcanising tube 12 is itself earthed.

The transformer core 20 has at least one winding 23 which lies at the output of an alternating current generator 24. The alternating current generator produces a low or high frequency signal level e.g. with an effective voltage of 20 volts. The annular magnetic alternating field caused by this produces in the conductor of the cable 14 a current e.g. of 12 mA. A total capacitance of the condensers 21 and 22 of 300 pF/m is taken as a basis here. The current in the cable 14 results in an annular magnetic field which induces an alternating voltage in the air-coils 17 and 18. If the cable 14 is in the middle between the air-coils 17 and 18 the same voltage is induced in both of them. Displacement in the direction towards one or the other air-coil leads to a corresponding difference in the induced voltage.

The air coils 17 and 18 are connected together at one pole and the other poles are connected to an adding circuit 25 and to a subtracting circuit 26. Voltages induced in the air-coils 17 and 18 are added in the adding circuit. The output signal of the adding circuit 25 is supplied to an amplifier 27 which amplifies the signal and feeds it back across a conduit 28 to an input of the alternating current generator 24. A potentiometer 29 at one input of the amplifier 27 gives a theoretical value so that the deviation is put on to the return input to the generator 24. This deviation is formed from the difference between the induced total voltage and the theoretical total voltage.

In the subtracting circuit 26 the voltages induced in the air-coils 17 and 18 are subtracted, whereby a total which deviates from zero indicates that the cable 14 has a deviation in the vulcanising tube. The difference total from the subtracting circuit 26 is supplied a phase-controlled rectifier 30, the output signal of which is supplied to an amplifier 31, the output of which is connected to a zero indicating device 32. The reference input of the phase-controlled rectifier 30 is supplied in a control conduit 33 at the output of the adding circuit 25.

With the aid of the described measuring device any deviation of the cable 14 from the required theoretical position is indicated by an output signal of the subtracting circuit 26 deviating from zero which when rectified and amplified controls the indicating device 32 and shows a position deviating from zero. Naturally other devices which convert measuring values are possible in place of the indicating device 32 or in addition to it.

With the aid of the measuring signal obtained in the way described for the slack of a conduit, a control device can of course also be operated in order to set the required slack automatically in each case. The slack measuring signal is compared in a control device as an actual signal with a theoretical signal, and the deviation is used to control a correcting element for changing the slack.

What is claimed is:

1. A process for determining the absolute position of an elongated object with respect to a reference axis, the object having an electrically conductive portion covered with insulating material and lying generally along the reference axis, said method comprising the steps of:

establishing a localized alternating magnetic field at a first location along the reference axis;

establishing a path for axial flow of electrical current in the conductive portion of said object;

placing the object in the localized alternating magnetic field for inducing a current in the object which generates a coaxial magnetic field about the object;

sensing the magnitude of the generated magnetic field at a second location displaced along the reference axis from said first location;

comparing the sensed magnitude of the generated magnetic field with a desired magnitude of the generated magnetic field;

altering the strength of the localized alternating magnetic field in accordance with any deviation between the sensed and desired magnitude of the generated magnetic field to restore the generated magnetic field to the desired magnitude;

measuring the intensity of the generated magnetic field at at least a pair of stations positioned on different sides of the reference axis at said second location and;

comparing the measurements obtained at said pair of stations to provide an indication of the absolute position of the object with respect to the reference axis.

2. The process according to claim 1 wherein the measuring step is further defined as measuring the intensity of the generated magnetic field at at least a pair of stations diametrically positioned with respect to the reference axis.

3. The process according to claim 1 wherein the terminal step is further defined as providing a signal responsive to the comparison of the measurements at said stations and controlling the signal in accordance with the sensing of the generated magnetic field.

4. The process according to claim 1 further defined as a process for determining the position of an elongated electrical cable having an electrically conductive core covered with an insulating coating with reference to the axis of a vulcanizing tube.

5. Apparatus for determining the absolute position of an elongated object with respect to a reference axis, the object having an electrically conductive portion covered with insulating material and lying generally along the reference axis, said apparatus comprising:

means for establishing a localized alternating magnetic field responsive to an input signal thereto at a first location along the reference axis, said object being located in said field for having induced therein a current in the electrically conductive portion which generates a coaxial magnetic field about the object;

magnetic field detection means located at a second location displaced from said alternating magnetic field establishing means along the reference axis and radially displaced from the reference axis for providing a signal proportional to the magnitude of the generated magnetic field and for providing a signal proportional to the difference in intensity of the generated magnetic field at least a pair of stations positioned on different sides of the reference axis;

means generating a reference signal proportional to the desired magnitude of the magnetic field;

comparator means coupled to said reference signal generating means and said magnetic field detection means for receiving the signal proportional to the magnitude of the generated magnetic field and the reference signal and providing an error signal, said comparator means being coupled to said alternating magnetic field establishing means for providing the error signal as the input signal thereto, said alternating magnetic field establishing means being responsive to said error for establishing the strength of the localized alternating magnetic field in accordance with the reference signal; and an indicator means coupled to said magnetic field detection means for receiving said difference signal and for providing an indication of the absolute position of the object with respect to the reference axis.

6. The apparatus according to claim 5 wherein said magnetic field detection means includes at least a pair of sensors positioned on different sides of the reference axis for ascertaining the intensity of the generated magnetic field at such positions and for providing signals proportional thereto, said magnetic field detection means further including summation means having input means coupled to said sensors for receiving said intensity signals and an output providing a summed signal indicative of the magnitude of the generated magnetic field, said magnetic field detection means further including a subtraction means having input means coupled to said sensors and an output providing said difference signal.

7. The apparatus according to claim 6 wherein said pair of sensors are diametrically positioned with respect to the reference axis.

8. The apparatus according to claim 5 wherein said indicator means includes signal control means for controlling a controlled signal in response to a controlling signal and wherein the difference signal is supplied to said means as the controlled signal and wherein the signal proportional to the generated magnetic field is applied to said means as the controlling signal.

9. The apparatus of claim 8 wherein said signal control means comprises a phase controlled rectifier having a power circuit receiving the difference signal and a control circuit receiving the signal proportional to the generated magnetic field.

10. The apparatus according to claim 5 wherein said alternating magnetic field establishing means comprises a toroidal core surrounding the object having at least one winding thereon energized by an input signal responsive power supply.

11. The apparatus according to claim 6 wherein said sensors comprise air coils coupled to said summation means and subtraction means.

12. The apparatus of claim 5 further defined as apparatus for determining the position of an elongated electrical cable having an electrically conductive core covered with an insulating coating with reference to the axis of a vulcanizing tube.

13. The apparatus according to claim 12 wherein said alternating magnetic field establishing means comprises a toroidal core arranged in a radial enlargement of said vulcanizing tube, said core having at least one winding thereon energized by an input signal responsive power supply.

14. The apparatus according to claim 12 wherein said magnetic field detection means includes at least a pair of sensors positioned on different sides of the reference axis arranged in a radial enlargement of said vulcanizing tube for providing said signals.

* * * * *